US012754143B2

(12) United States Patent
Carroll et al.

(10) Patent No.: US 12,754,143 B2
(45) Date of Patent: Oct. 6, 2026

(54) CONVEYOR HEALTH INSPECTION METHOD

(71) Applicant: GM GLOBAL TECHNOLOGY OPERATIONS LLC, Detroit, MI (US)

(72) Inventors: Dennis J. Carroll, Leander, TX (US); Charles A. Wiley, Austin, TX (US); David R. Kracko, Dewitt, MI (US); Nicholas S. Ellis, Royal Oak, MI (US); Philip L. Griggs, Troy, MO (US); Eric R. Newcomb, Midlothian, TX (US); Robert Hardin, Cedar Park, TX (US); Joshua Huang, Round Rock, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 19/036,571

(22) Filed: Jan. 24, 2025

(65) Prior Publication Data

US 2026/0219205 A1 Jul. 30, 2026

(51) Int. Cl.

| | |
|---|---|
| ***B65G 43/02*** | (2006.01) |
| ***G01B 11/24*** | (2006.01) |
| ***G01N 21/88*** | (2006.01) |
| ***G01N 21/95*** | (2006.01) |

(52) U.S. Cl.

CPC ............. *G01N 21/95* (2013.01); *B65G 43/02* (2013.01); *G01B 11/24* (2013.01); *G01N 21/8806* (2013.01)

(58) Field of Classification Search

CPC .... B65G 43/02; G01N 21/8806; G01N 21/95; G01B 11/24

USPC ........................................................ 198/502.1

See application file for complete search history.

(56) References Cited

U.S. PATENT DOCUMENTS

| | | | | |
|---|---|---|---|---|
| 5,877,858 | A * | 3/1999 | Kerstens | G11B 5/84 356/600 |
| 9,703,115 | B2 * | 7/2017 | Schneider | G06K 7/10831 |
| 10,865,052 | B2 * | 12/2020 | Hou | B65G 43/02 |
| 11,767,176 | B1 * | 9/2023 | Gomez | B65G 21/00 198/502.1 |
| 2006/0181698 | A1 * | 8/2006 | Treves et al. | |
| 2016/0300091 | A1 * | 10/2016 | Cumoli et al. | |
| 2019/0322462 | A1 * | 10/2019 | Johnson et al. | |
| 2021/0078834 | A1 * | 3/2021 | Novacek | |
| 2021/0086523 | A1 * | 3/2021 | Bassi | |

(Continued)

*Primary Examiner* — Douglas A Hess

(74) *Attorney, Agent, or Firm* — Quinn IP Law

(57) ABSTRACT

A method for inspecting a rail of a conveyor system includes illuminating the rail with a light beam in the form of a line of light directed obliquely to a surface of the rail. The method further includes translating the light beam along the rail in a direction of translation, the direction of translation generally perpendicular to the line of light and sensing reflection of the light beam from the surface as the light beam is translated. The method additionally includes using the reflection to create a three-dimensional topography of the surface, applying thresholds to the three-dimensional topography to detect features of potential interest in the topography, and determining physical characteristics of the features of potential interest. In addition, the method includes using the physical characteristics to identify faults in the rail associated with the features of potential interest and mapping locations of the faults.

20 Claims, 13 Drawing Sheets

(56) References Cited

U.S. PATENT DOCUMENTS

| | | | |
|---|---|---|---|
| 2024/0111070 | A1* | 4/2024 | Morton |
| 2024/0130621 | A1* | 4/2024 | Islam |
| 2025/0208055 | A1* | 6/2025 | Thurin et al. |

* cited by examiner

| Feature # | 270 | 272 | 274 | 276 |
|---|---|---|---|---|
| Region | | | | |
| NumPixels | | | | |
| MinWidth | | | | |
| MaxWidth | | | | |
| MinDepth | | | | |
| MaxDepth | | | | |
| AvgWidth | | | | |
| AvgDepth | | | | |
| StdevDepth | | | | |
| Slope | | | | |
| RValue | | | | |
| GapPct | | | | |
| Intercept | | | | |
| Density% | | | | |
| ... | | | | |

CONVEYOR HEALTH INSPECTION METHOD

INTRODUCTION

This disclosure is in the field of inspection methods and systems for manufacturing conveyor systems.

Conveyor systems for manufacturing lines may include rails on which trolleys are conveyed. Such trolleys may tow or otherwise move carriers for products being manufactured, such as automobiles, automobile bodies, or automobile chassis.

The rails of conveyor systems may be under significant stress and may therefore wear or otherwise develop faults over time. In order to maintain high uptime in the operation of a manufacturing line, a convenient and reliable method for diagnosing faults in rails of the conveyor will be advantageous. Such a method and system will allow identification and location of faults so that appropriate maintenance may be performed.

SUMMARY

A method for inspecting a rail of a conveyor system includes illuminating the rail with a light beam in the form of a line of light directed obliquely to a surface of the rail. The method further includes translating the light beam along the rail in a direction of translation, the direction of translation generally perpendicular to the line of light and sensing reflection of the light beam from the surface as the light beam is translated. The method additionally includes using the reflection to create a three-dimensional topography of the surface, applying thresholds to the three-dimensional topography to detect features of potential interest in the topography, and determining physical characteristics of the features of potential interest. In addition, the method includes using the physical characteristics to identify faults in the rail associated with the features of potential interest and mapping locations of the faults.

In the inspection method, the faults may include wear of the rail. The faults may also include debris on the rail. Mapping locations of the faults may include using a position encoder that measures position of the light beam as the light beam translates along the rail. The light beam may provide continuous illumination along the line of light. The method may further include translating the light beam multiple times relative to the rail to confirm the identified faults. The method may further include translating the light beam a plurality of times relative to the rail to detect faults that were missed during an earlier translation of the light beam. The rail may include an I-beam, or the rail may include two opposing C-channels.

Further, in the inspection method, using the physical characteristics to identify faults in the rail may include applying the physical characteristics to a fault tree to identify the faults. The physical characteristics may include surface area. The physical characteristics may include depth. The physical characteristics may include R-Value.

A second method for inspecting a rail of a conveyor system includes illuminating an inner periphery of the rail with a light beam in the form of a line of light. The method further includes translating the light beam along the rail in a direction of translation, the direction of translation generally perpendicular to the light beam and using the light beam to identify one or more faults in the rail. The rail may include two opposing C-channels. The one or more faults may include deformation in the shape of the rail, sagging of the rail, or imperfections in an internal surface of the rail.

An additional method for inspecting a rail of a conveyor system includes illuminating the rail with a light beam in the form of a line of light directed obliquely to a surface of the rail and extending in a first direction and translating the light beam along the rail in a direction of translation, the direction of translation generally perpendicular to the first direction. The method additionally includes sensing reflection of the light beam from the surface as the light beam is translated. Further, the method includes using the reflection to construct a three-dimensional topography of the surface, where the three dimensional topography of the surface is constructed using the following: capturing video of the reflected light beam as the light beam translates along the rail, the video comprising successive frames; for each of the frames, determining a highest-intensity pixel for each of a plurality of columns that extend parallel to the direction of translation; saving a y[i,x] location for each highest-intensity pixel, where y is the direction of translation, x is the first direction and i is a number of a respective one of the successive frames; and concatenating the [i,x] locations to construct the three-dimensional topography.

The method further includes applying thresholds to the three-dimensional topography to detect features of interest in the topography, determining physical characteristics of the features of interest, using the physical characteristics to identify faults in the rail associated with the features of interest, and mapping locations of the faults.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

Figure 1:
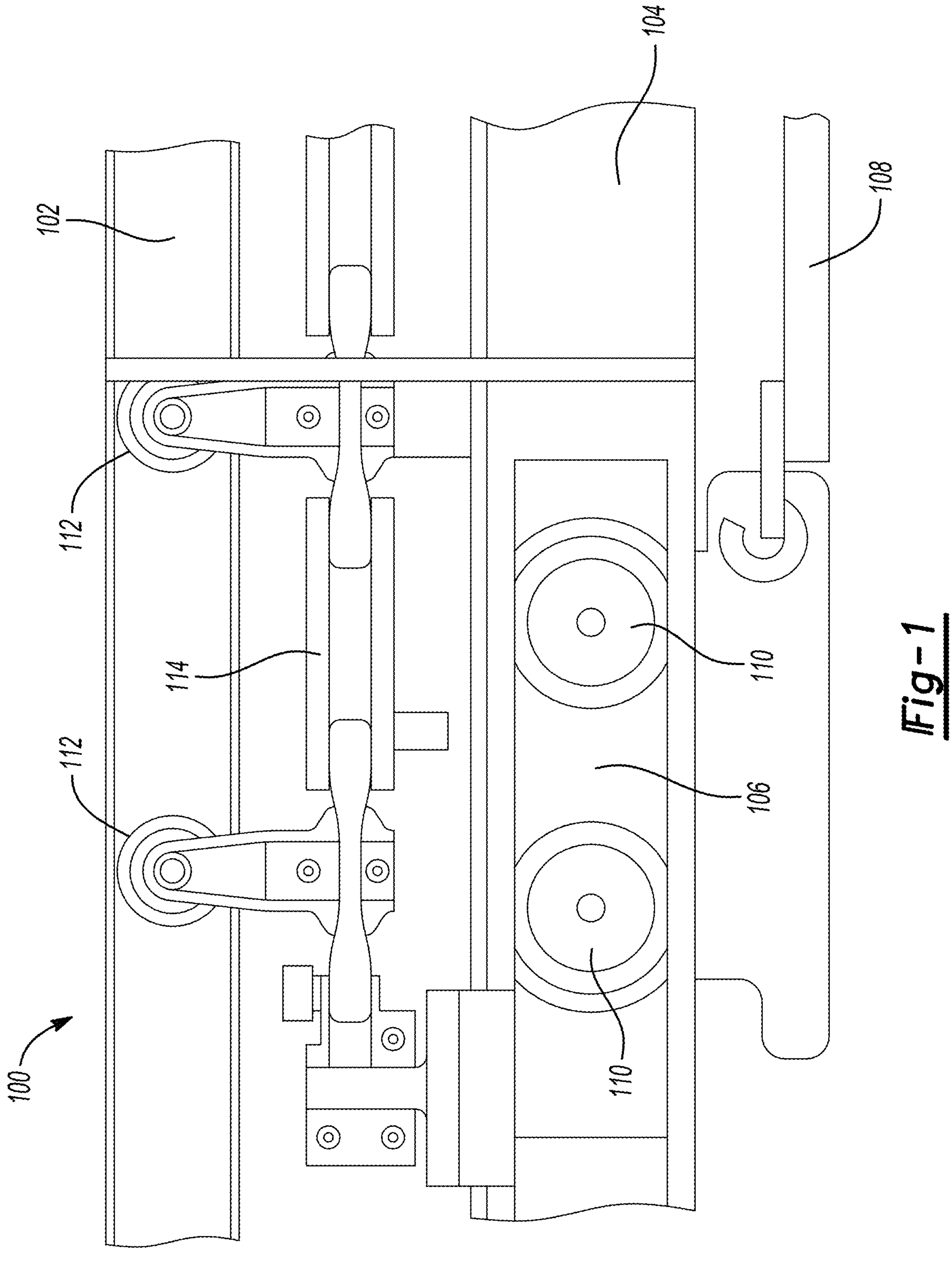
FIG. 1 illustrates a portion of a conveyor system for a manufacturing line.

Refer first to FIG. 1. There is illustrated a portion of a conveyor system 100 for a manufacturing production line. Conveyor system 100 may include a first rail 102 and a second rail 104. First rail 102 may be an I-beam. Second rail 104 may be two C-channels disposed opposite one another with their open faces opposing each other.

Trolley 106 is disposed to move along first rail 102 and second rail 104. Trolley 106 may pull a tow bar 108 that is connected to a carrier that is towed by trolley 106. The carrier towed by trolley 106 may be, for instance, a carrier carrying a motor vehicle body along the manufacturing production line. The carrier may be disposed below trolley 106. Trolley 106 may have two wheels 110 that ride along second rail 104. Trolley 106 may also have two additional wheels 112 that ride along first rail 102. A chain 114, motivated by a prime mover (not shown) may tow trolley 106 along the production line. (Note that the C-channel of second rail 104 in the foreground of FIG. 1 is partially cut away in FIG. 1 to create a window through the wall of the C-channel for illustration purposes, including to more fully illustrate trolley 106 and wheels 110.)

First rail 102 and second rail 104 may become worn, may crack or fracture, may experience cracked or broken welds, may sag, or may otherwise degrade or deform over time. It may be advantageous to identify the existence of degradation, the nature of the degradation, and the location of the degradation in order to perform appropriate maintenance on first rail 102 and second rail 104.

Figure 2:
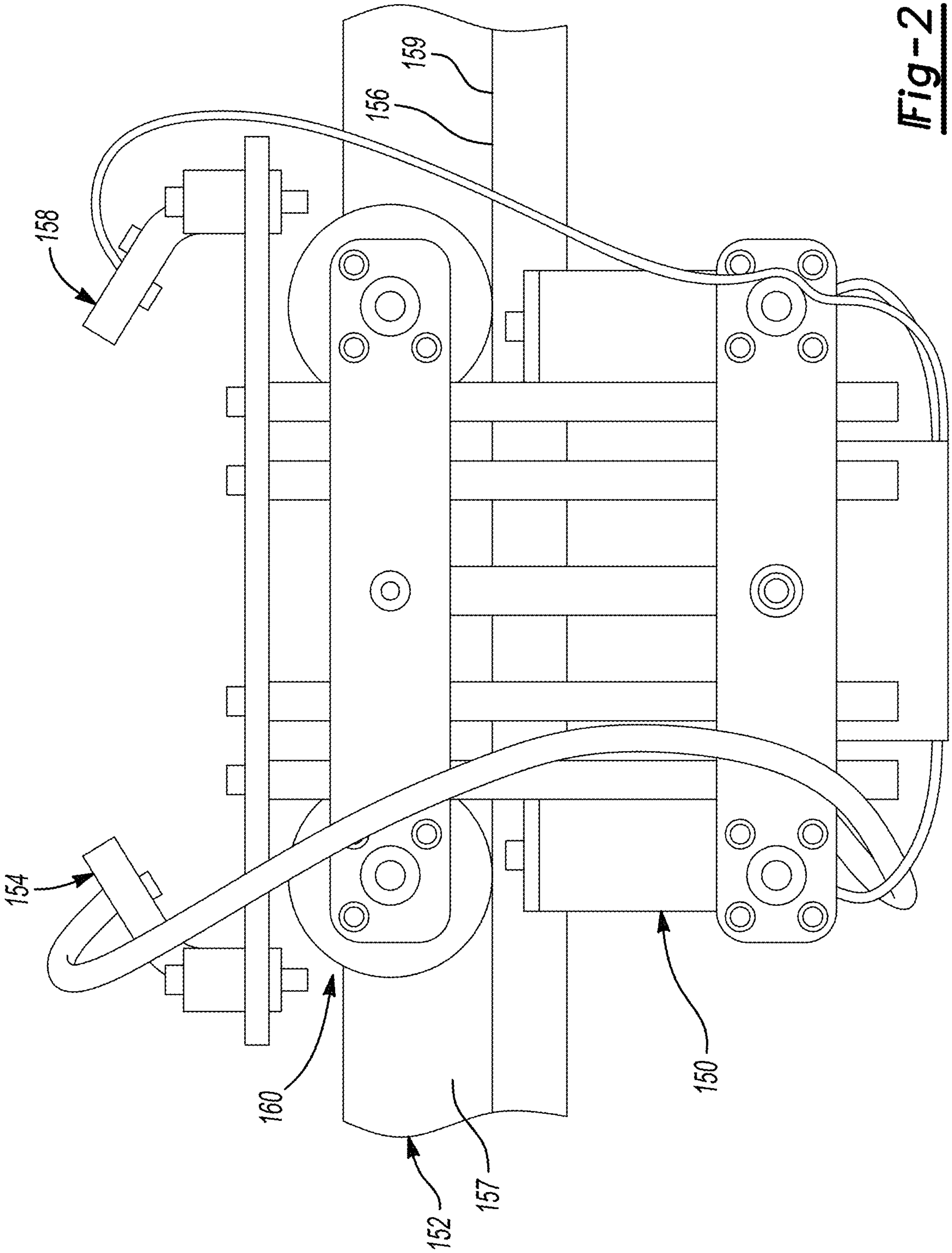
FIG. 2 illustrates an inspection device for inspecting the conveyor system.

Refer now to FIG. 2. There, an inspection device 150 is illustrated. Inspection device 150 may translate along a rail 152 for the purpose of inspecting surface(s) of rail 152. Inspection device 150 may be installed on a trolley, such as trolley 106, or inspection device may be towed by a trolley. It should be understood that because rail 152 may be stationary, inspection device 150 may translate relative to rail 152.

Inspection device 150 may comprise a light source 154. Light source 154 may provide a beam or line of light that illuminates a surface of rail 152 that is being inspected. In the exemplary configuration shown in FIG. 2, inspection device 150 may inspect a flange 156, which in this example is horizontally disposed, of rail 152. Light source 154 may be directed at an oblique angle (that is, not a right angle) to the surface being inspected. Light source 154 may project light in a straight line. The projection may be continuous, rather than scanning across the surface being illuminated. Light source 154 may be a light-emitting diode ("LED"), incandescent lamp, laser, or other continuous source to provide a crisp straight line not affected by the raster scan of a camera. The laser may be nonsweeping. Light source 154 may provide white light or may be other colors, or it may be outside the visible spectrum, such as infrared or ultraviolet. Light source 154 may be of high-energy frequencies that may be detectable even if diffused through translucent deposits on the scanned surface. Light source 154 may provide a solid, nonscanning, narrow line of light that may be cast on the floor, walls, top, and/or flanges of the rails of the conveyor system, such as rail 152.

Inspection device 150 may also include a light detector 158. Light detector 158 is positioned to detect reflection of the light beam from the surface of rail 152 that is being inspected. Light detector 158 may be a camera. Light detector 158 need not be for visible light. As discussed above, the projection of light from light source 154 may be continuous (providing continuous illumination along the line of light), rather than scanning across the surface being illuminated; this may help prevent the light synchronizing with the camera raster and creating false dead zones in detection of the projected light line. The oblique positioning of the light source 154 and light detector 158 may be such that they are effective even if they are inspecting a highly polished surface that acts as a mirror.

Inspection device 150 may include encoder wheel 160 that is in contact with rail 152 and that rotates as inspection device 150 translates along rail 152. A suitable position encoder may track the rotation of wheel 160 in order to allow sensing of the position of light source 154 and detector 158 as inspection device 150 translates along rail 152. Encoder wheel 160 may also be on a measured slide or an encoded elbowed arm so that encoder wheel may also provide a caliper function. This accommodates a case where the flange of a rail wears down and where the wear spans the entire surface; the surface may appear flat and healthy when in fact is has worn down.

Inspection device 150 may obviate the need for a human inspector to gain visual access to rail 152 for the purpose of inspecting rail 152. Rail 152 may run in areas of a factory where ready access by a human inspector may be difficult.

In FIG. 2, inspection device 150 is illustrated with light source 154 disposed to illuminate flange 156 of rail 152, flange 156 being horizontally disposed. Light source 154, or additional light sources, may also illuminate the body of the rail (that is, the vertical portion 157 of rail 152 as disposed in FIG. 2). The diagnosis described herein may be done on any region of a conveyor rail, including flanges and bodies of beams and channels that may comprise the rail.

Figure 3:
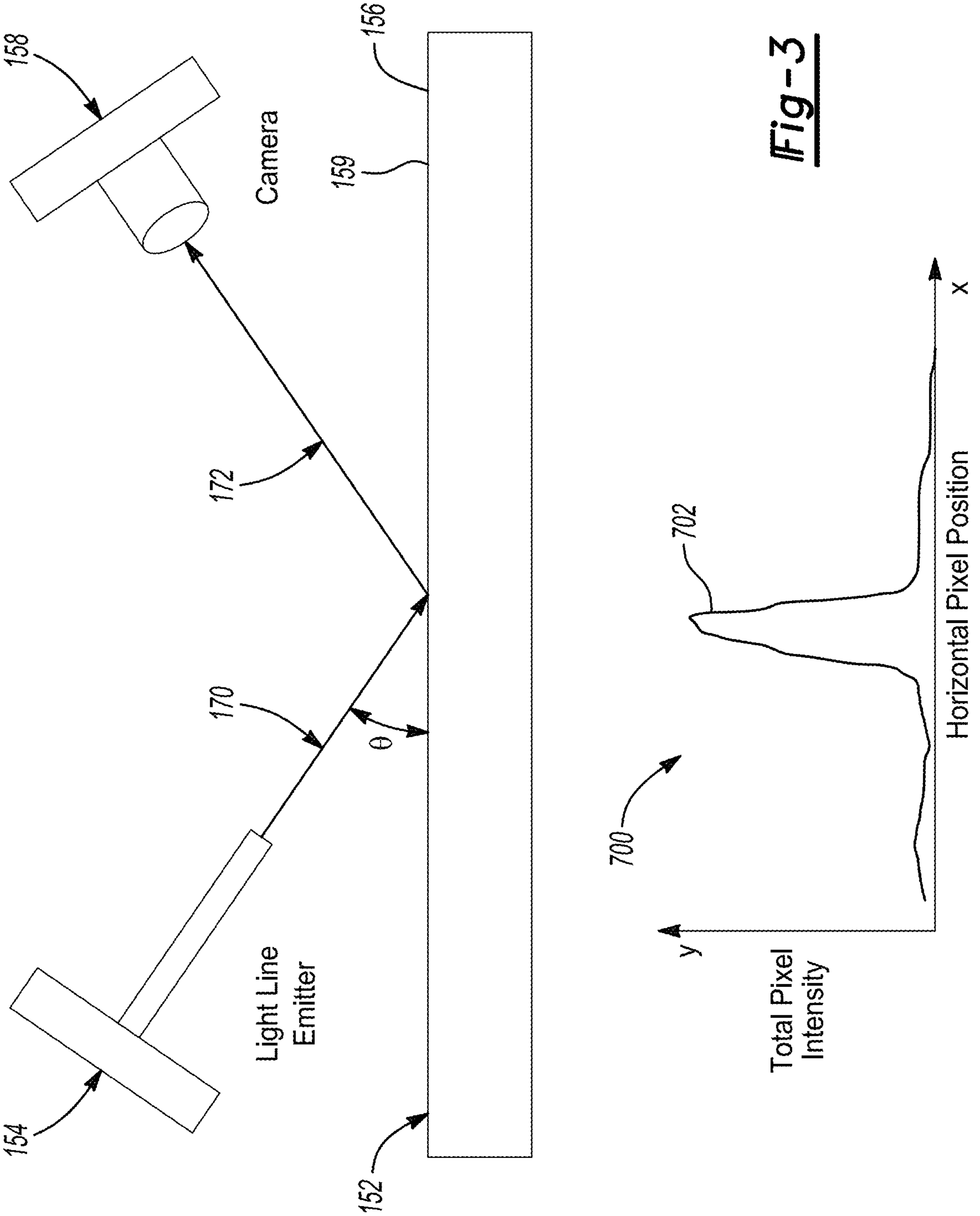
FIG. 3 illustrates a light source for illuminating a rail of the conveyor system and a light detector to detect light reflected from the rail.

Refer now additionally to FIG. 3. Illustrated there are light source 154 and light detector 158. Light source 154 may emit light beam 170, which reflects from surface 159 of rail 152 and the reflection detected by light detector 158. As described above, light beam 170 may be trained on surface 159 of rail 152 at an oblique angle θ. Oblique angle θ may be 45 degrees. Light beam 172 represents the reflection of light beam 170 and is detected by detector 158.

The deflection of the reflection of light beam 170 may cause projection of the straight line of light beam 170 to create curves, jumps, or even disappear depending upon the topography of the rail being inspected.

A system for inspecting conveyor system 100 is illustrated with reference to FIG. 4. There, the scanning device 200, which may be considered to be, collectively, light source 154 and detector 158 and associated scanner management electronics, is illustrated. Post-processing server 202 may process the inspection signals gathered by scanning device 200.

Post-processing server 202 may be a microprocessor-based controller that should be understood to include appropriate microcomputer resources (e.g., microcontroller, memory, software, inputs, outputs, displays, peripherals, and the like) to perform the functions ascribed to electronic controller post-processing server 202 herein. The functions of post-processing server 202 may also be shared by one or more additional electronic controllers that may be networked together and therefore able to share data and computing responsibility.

Post-processing server 202 may be responsive to and may execute instructions, each of which may comprise one or more software commands. Each instruction may further comprise one or more additional instructions.

Post-processing server 202 may include and/or may be in communication with a review console 203. Review console 203 may include a human-machine interface (displays, user controls) that allows an operator to control, query, and receive output data (including diagnosis of the nature and location of faults in the conveyor rail system). The operator may then use the output data to arrange for any required repairs/maintenance of the rails.

The signal from the scanner is provided to scanner reader 204. Scanner reader 204 may synchronize its data acquisition with encoder wheel 160, which allows tracking of the position of inspection device 150, including light source 154 and detector 158. The data from encoder wheel 160, which may travel along with inspection device 150, may be further passed to other blocks within post-processing server 202.

Figure 5:
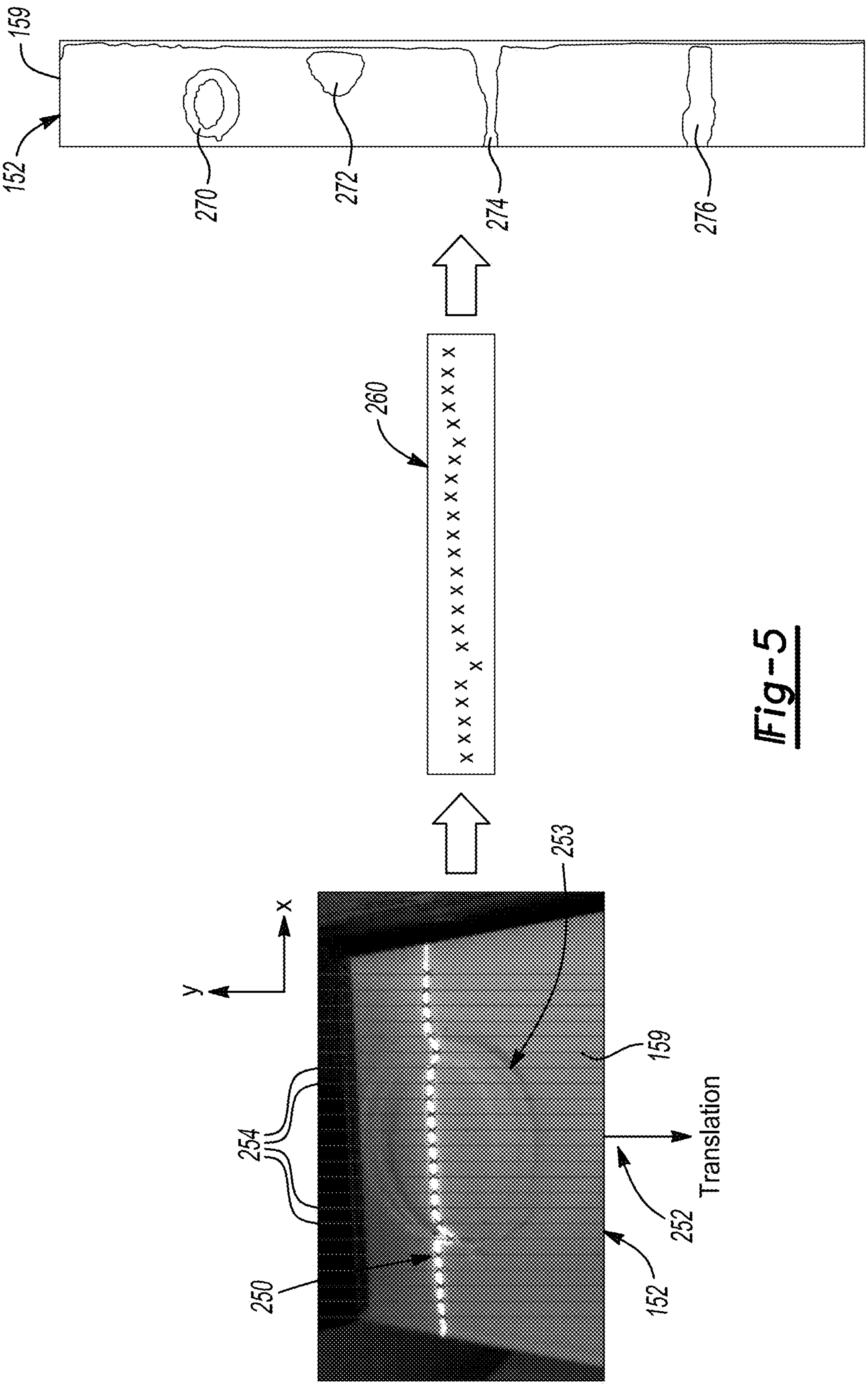
FIG. 5 illustrates translation of a light beam from the light source into a three-dimensional topography of features on the surface of a conveyor rail being inspected.

At block 208, three-dimensional translation of the data gathered by inspection device 150 may be performed. In short, light deflections from the light beam may be translated to create the three-dimensional topography of the surface being inspected. Here, refer additionally to FIG. 5. There, the surface 159 of rail 152 is illustrated, illuminated by light beam 250. Light beam 250 may translate, along with inspection device 150, in the direction of arrow 252. As shown in FIG. 5, light beam 250 may be in a region of a three-dimensional feature 253, which may be a gouge, rut or other fault or feature, worn into surface 159. The video captured of light beam 250 travelling along rail 152 may be processed frame-by-frame. For each frame numbered, say, "i", the highest intensity pixel for each column 254 illustrated in FIG. 5 is located and the y-value for the pixel is saved (y[i,x]) (that is, y as a function of both frame number and column number). If there is a tie for the highest intensity, y[i,x] may be defined as the average y-value for all member pixels of the tie. The collected y[i,x] represents the single scanned line, say, line 260, from the frame and is normalized to a deflection delta minimum and/or maximum. The series of y[i,x] location extractions from each frame are concatenated together, forming the representation of the three-dimensional topography of the scanned surface shown in the rightmost image of FIG. 5.

Note in FIG. 5 that coordinates "x" and "y" are called out. In this disclosure, "y" will refer to a direction in which the light beam (here, light beam 250) translates (that is, moves) along the rail. "x" will refer to a direction transverse to "y" and located along the surface being inspected. Thus, in FIG. 5, where a horizontal surface is being inspected, "x" will be horizontal. Where, however, a vertical surface, such as a web or body of an I-beam is being inspected, "x" may be vertical and, again, transverse to the direction in which the light beam translates.

In the scanning described in the previous paragraph, there may be a gap in the surface where the projected light is completely hidden from the view of the camera. (Consider an analogue where a person is standing on an edge of a cliff and there is a projection on a cliff face in front of and below the person. The person would not see it. That may be considered a "gap".) If the highest intensity pixel discussed in the previous paragraph is below a threshold, that means that the projected line is not visible in that frame. Hence, there is a "gap" that the projected line has fallen into and from which it may not be detected. In that case, the y[i,x] may be set to −1 or some other value to designate that gap.

Figure 4:
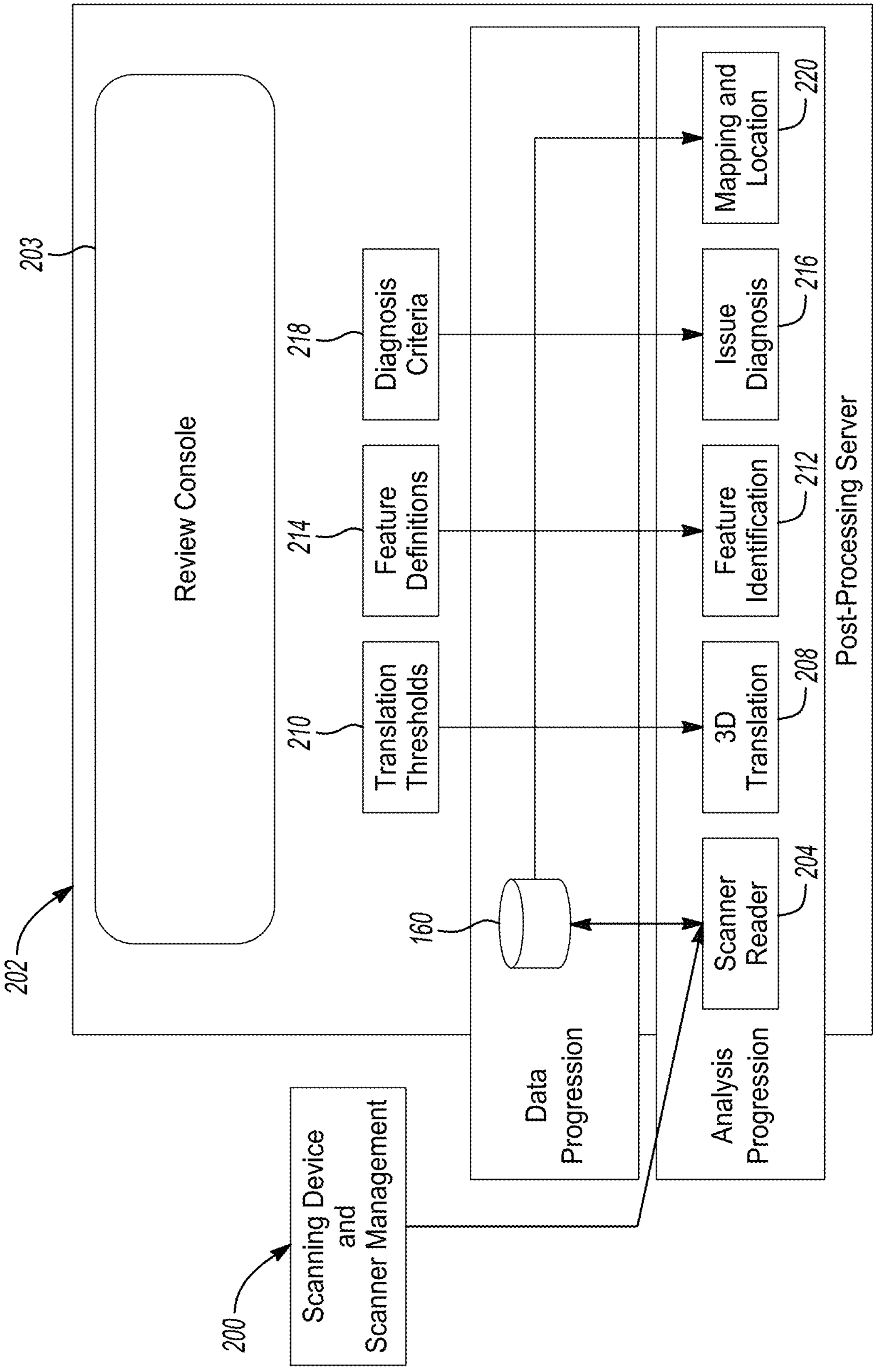
FIG. 4 is a block diagram of a system for inspecting a conveyor system.

In the generation of the representation of the three-dimensional topography of the surface being inspected, the y[i,x] collection may be filtered by user-set translation thresholds (block 210, FIG. 4). The thresholds may be a set of thresholds used to identify whether a particular measurement is significant enough to represent a feature or a portion of a feature in the surface being inspected. The feature may be a feature of potential interest in identifying and diagnosing faults in the rail. Application of the thresholds may create "islands" of qualified coordinate pairs that may represent features of potential interest such as feature 270, feature 272, feature 274, and feature 276. An "island" may also be a gap comprised of gap pixels.

At block 212 (FIG. 4), features of potential interest, for instance feature 270, feature 272, feature 274, and feature 276 are identified, with the aid of feature definitions 214. Feature definitions 214 may be the physical characteristics that may be used to identify features of potential interest. For instance, feature definitions 214 may include the following metrics of the features:

| Metrics |
|---|
| Region |
| Number of Pixels |
| Minimum Width |
| Maximum Width |
| Minimum Depth |
| Maximum Depth |
| Average Width |
| Average Depth |
| Depth Standard Deviation |
| Slope |
| R-Value |
| Count of Gap Pixels |
| Gap Percentage |
| Intercept |
| Density Percentage |
| Others |

In the above table,

Region means location of a feature;

Number of Pixels means the size or surface area of the feature, which may be measured in pixels;

Minimum Width means the minimum width of the feature;

Maximum Width means the maximum width of the feature;

Minimum Depth means the minimum depth of the feature;

Maximum Depth means the maximum depth of the feature;

Average Width means the average width of the feature;

Average Depth means the average depth of the feature;

Depth Standard Deviation means the standard deviation of the depth of the feature; Slope means the slope of the feature;

R-Value is a measurement of the correlation among a group of coordinate points along a defined line;

Count of Gap Pixels is the number of pixels in a gap;

Gap Percentage means the percentage of a region under inspection that is occupied by a gap;

Intercept means the y-intercept of a linear equation; and

Density Percentage means the number of pixels in the feature, divided by the number of pixels contained in a rectangle defined by the minimum and maximum width and depth.

Figure 6:
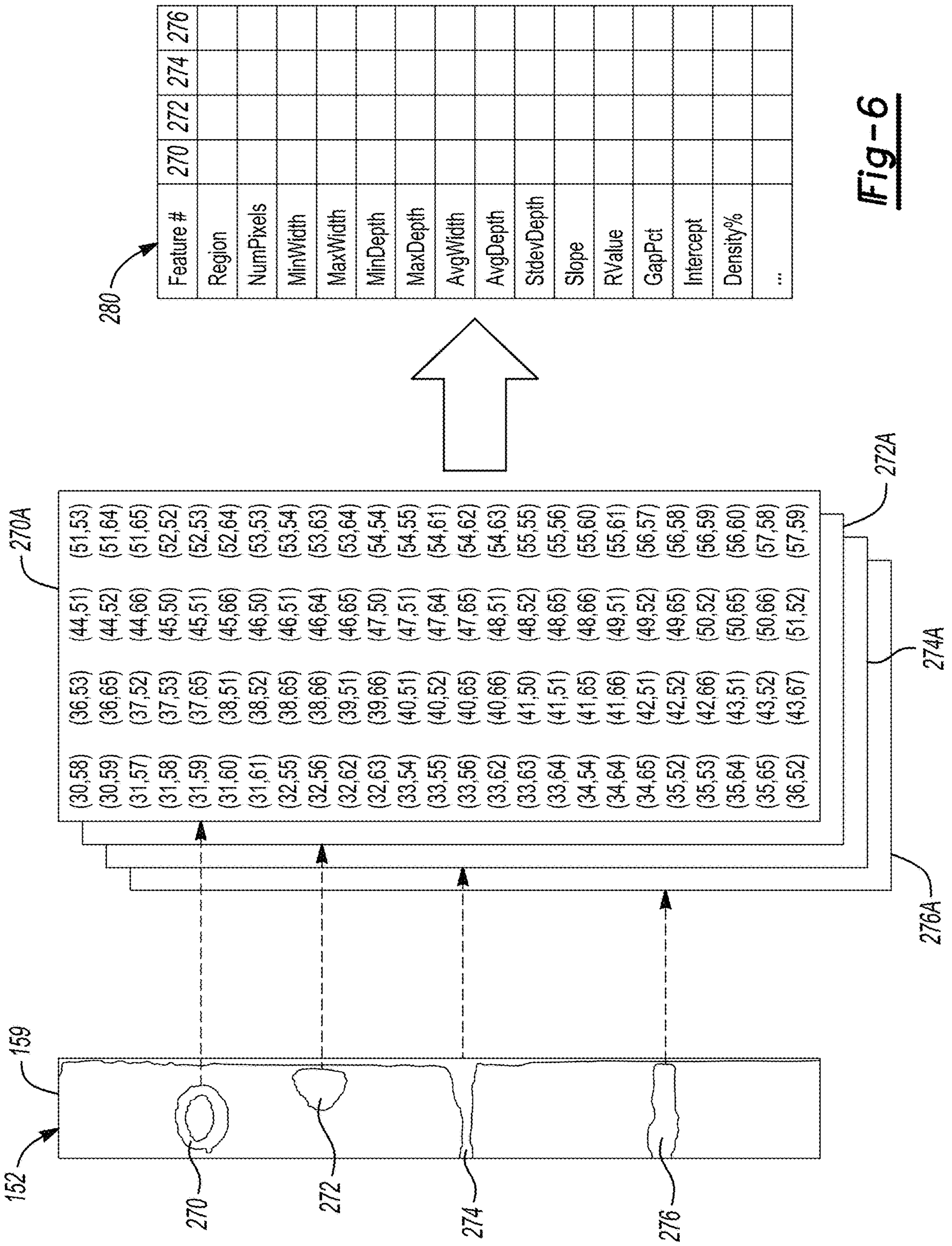
FIG. 6 illustrates identification of features of potential interest on the conveyor rail being inspected.

Feature identification (block 212) may then proceed with further reference to FIG. 6. There, each coordinate pair that is included in a particular feature (e.g., feature 270) may be separated into contiguous groups (e.g., group 270A). The coordinate pairs belonging to other features, such as feature 272, feature 274, and feature 276, may additionally be separated into contiguous groups (that is, group 272A, group 274A, and group 276A, respectively). As such, each feature may be quantified, evaluated, and characterized with a set 280 of extensible metrics.

Figure 7:
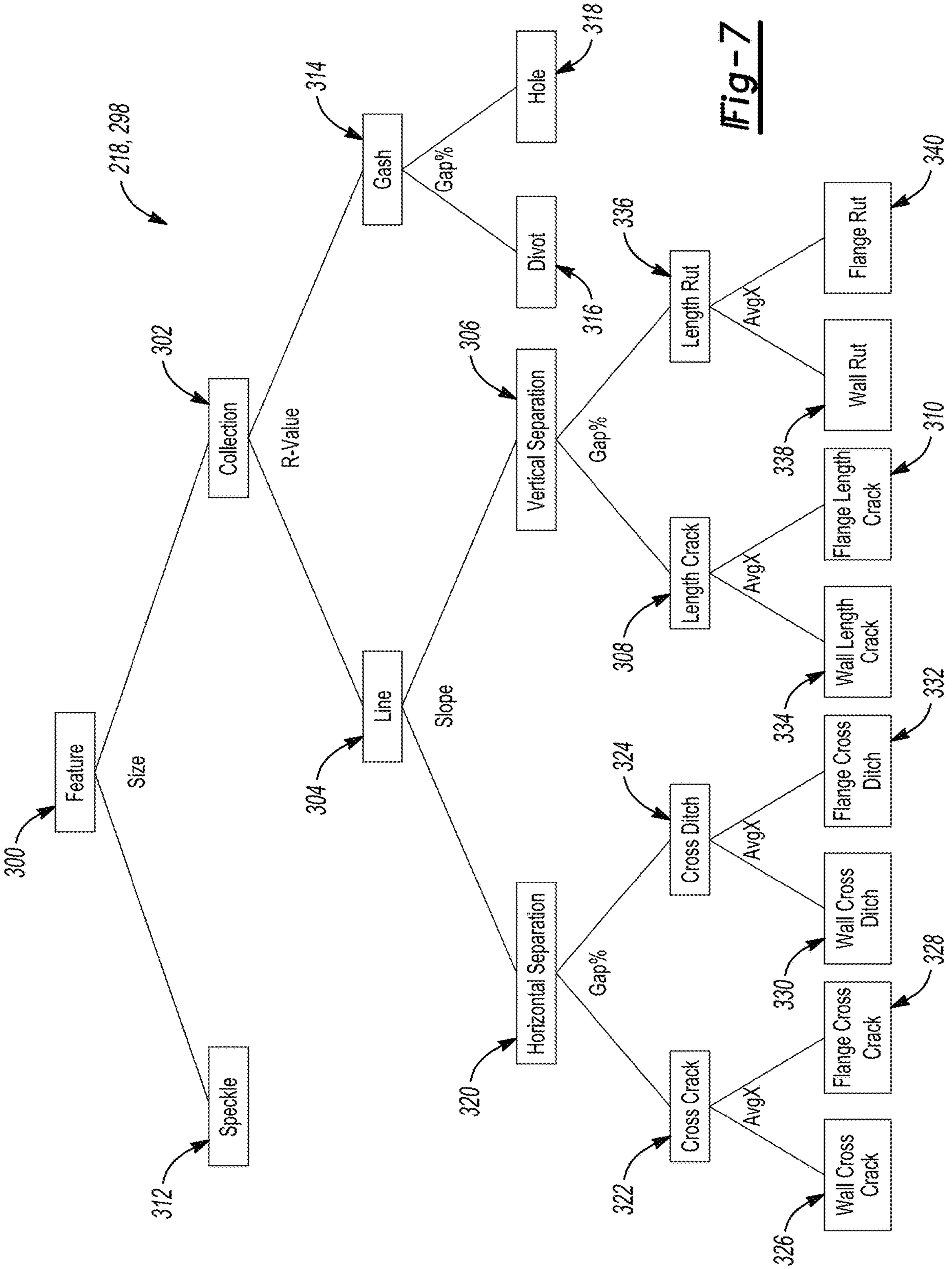
FIG. 7 is a fault tree that may be used to identify faults in the conveyor rail being inspected.

Issue diagnosis may next be performed at block 216 (FIG. 4), with the aid of diagnosis criteria 218. Diagnosis criteria 218 may take the form of a fault tree 298, as illustrated in FIG. 7. A feature may be analyzed with respect to fault tree 298 in order to identify and diagnose the issue that caused the feature. For instance, applying the fault tree of FIG. 7, a feature having a size above a predetermined threshold (say, 250 units) (block 300), an absolute R-Value above another predetermined threshold (say, 0.7) (block 302), a slope less than another predetermined threshold (say, 0.2) (block 304), a gap percentage less than another predetermined threshold (say, 10%) (block 306) and average width greater than another predetermined threshold (say, 170 units) (block 308) may be diagnosed as a lengthwise crack in the flange of the rail (block 310 in FIG. 7).

Figure 12:
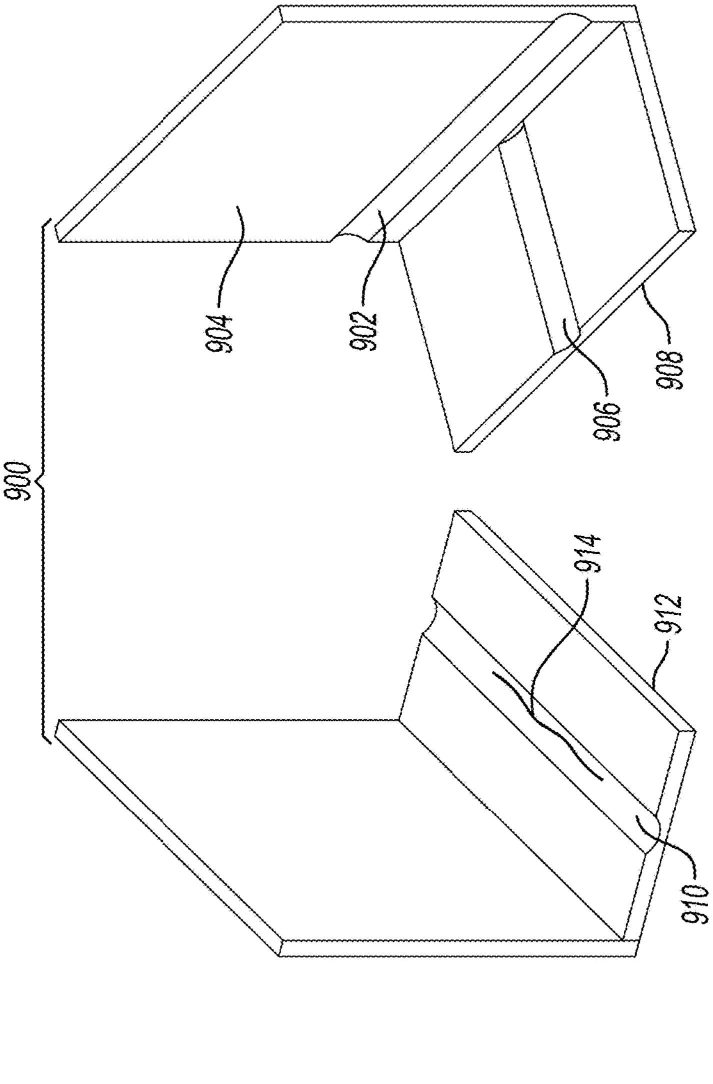
FIG. 12 illustrates various faults that may be diagnosed in a conveyor system.

FIG. 12 illustrates examples of some of the various faults that may be diagnosed in a rail 900. FIG. 12 illustrates a rut 902 in a wall 904 of rail 900, a ditch 906 in a flange 908 of rail 900, and a rut 910 in a flange 912 of rail 900. A ditch, such as ditch 906, may run generally in an "x" direction, transverse to the length of rail 900. A rut, such as rut 902 or 910, may run generally in a "y" direction, along the length of rail 900. Ruts and ditches may be similar in shape. A rut or ditch may be created by long-term contact wear. A rut may be created by a wheel or surface and therefore may run a relatively long distance.

A rut such as rut 910 may exhibit a crack, such as crack 914, due to overstressing caused by weakening created by the rut. A crack may be narrower than a rut. Whereas a rut may be a smooth, worn area that does not fully penetrate the wall or flange of the rail and therefore may have few or no gap pixels, a crack such as crack 914 may have gap pixels.

More generally and with continued reference to FIG. 7, at block 300 the size of the feature at issue may be evaluated. If the size is less than a threshold, the feature may be determined to be a speckle in the rail (block 312). The speckle may be defined as a feature consisting of a small collection of pixels, where the count of the pixels exceeds a tunable lower threshold but is less than a tunable upper threshold. While still a fault, the speckle may be considered predominately cosmetic. The speckle may represent a "nick" or small anomaly on the rail that is likely not of near-term actionable consequence; it may be noted by the maintenance team for future monitoring. The speckle may also be a metal shaving or other debris that may be indicative of wear, such as by scratching or scraping, of the surface of the rail being inspected. On the other hand, if the size of the feature at issue is greater than the tunable upper threshold, then the feature may be determined to be comprised of a collection of pixels larger than a speckle.

At block 302, the R-value of the collection of pixels may be evaluated. The R-value is a statistical tool used to determine the extent of correlation of multiple data points along a straight line defined by the equation $y=mx+b$, where b is the y-intercept and m is the slope. If the R-value is above a threshold, then the feature may be determined to be in the nature of a line (block 304). If the R-value is below the threshold, the feature may be determined to be in the nature of a gash (block 314) that does not substantially bear the form of a linear shape. A gash may be a non-linear area of damage to a surface that may be created by one or more impacts that should not normally occur. A gash may be larger than a speckle.

At block 304, the slope of the line may be evaluated. If the slope is below a threshold, then the line may be evaluated to be in the nature of a horizontal separation in the rail (block 320). If the slope is above the threshold, then the line may be evaluated to be in the nature of a vertical separation in the rail (block 306).

At block 320, the gap percentage of the horizontal separation may be evaluated. If the gap percentage is above a threshold, then the feature may be evaluated to be in the nature of a cross crack (block 322). If the gap percentage is below the threshold, then the feature may be evaluated to be in the nature of a cross ditch (block 324).

At block 322, the average X value of the cross crack may be evaluated. If the average X value is above a threshold, the cross crack may be evaluated to be a cross crack in a wall of the rail (block 326). If the average X value is below the threshold, then the cross crack may be evaluated to be cross crack in a flange of the rail (block 328).

At block 324, the average X value of the cross ditch may be evaluated. If the average X value is above a threshold, then the cross ditch may be evaluated to be a cross ditch in a wall of the rail (block 330). If the average X value is below the threshold, then the cross ditch may be evaluated to be a cross ditch in a flange of the rail (block 332).

At block 306, the gap percentage of the vertical separation may be evaluated. If the gap percentage is greater than a threshold, then the vertical separation may be evaluated to be a length crack (block 308). If the gap percentage is less than the threshold, then the vertical separation may be evaluated to be a length rut (block 336).

At block 308, the average X value of the length crack may be evaluated. If the average X value is greater than a threshold, then the length crack may be evaluated to be a wall length crack (block 334). If the average X value is less than the threshold, then the length crack may be evaluated to be a flange length crack (block 310).

At block 336, the average X value of the length rut may be evaluated. If the average X value is greater than a threshold, then the length rut may be evaluated to be a wall rut (block 338). If the average X value is less than the threshold, then the length rut may be evaluated to be a flange rut (block 340).

Figure 13:
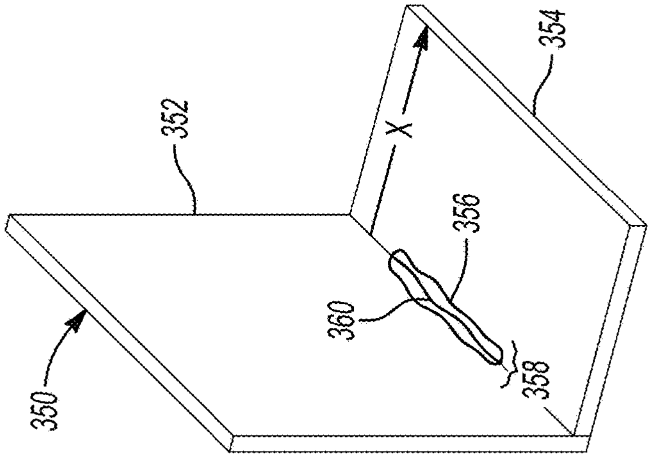
FIG. 13 illustrates additional faults that may be diagnosed.

Illustrations of the features evaluated at block 306, block 308, and block 336 are shown with reference to FIG. 13. There, a portion of a rail 350 is illustrated. Rail 350 may have a wall 352 and a flange 354. Rail 350 may include a vertical separation 356. Vertical separation 356 may have an "x" width 358 having an average value ("AvgX"). Vertical separation 356 may also have a gap 360. A gap percentage may be defined as the number of pixels in gap 360 divided by the number of pixels in vertical separation 356. According to fault tree 298, then, vertical separation 356 may be identified as having a size (NumPixels) above a first threshold, an absolute value of slope being greater than a second threshold, and an R-Value greater than a third threshold.

At block 314, the gap percentage of the gash may be evaluated. If the gap percentage of the gash is greater than a threshold, then the gash may be evaluated to be a divot (block 316). If the gap percentage of the gap is less than the threshold, then the gash may be evaluated to be a hole (block 318).

The diagnostic steps and thresholds applied in fault tree 298 may be based on experience learned in diagnosing similar or other conveyor systems. The thresholds used in the various decisions in fault tree 298 may vary from system to system. The comparisons applied in fault tree 298 may be "equal to", "not equal to", "less than", "less than or equal to", "greater than", "greater than or equal to", or "within a range".

Further, the above diagnosis may include multiple features to measure gaps and tolerances between features to detect defects such as separations. And features may include turns, such that the left and right lines advance or recede relative to each other as well as the same relationships between flange and ceiling for turns up or down.

Referring again to FIG. 4, mapping and location of the diagnosed faults (block 220) may be performed. Location of the faults may be aided by data from encoder wheel 160 which allows the system to track the location of inspection device 150 as it translates relative to the rails of the conveyor system.

Figure 8:
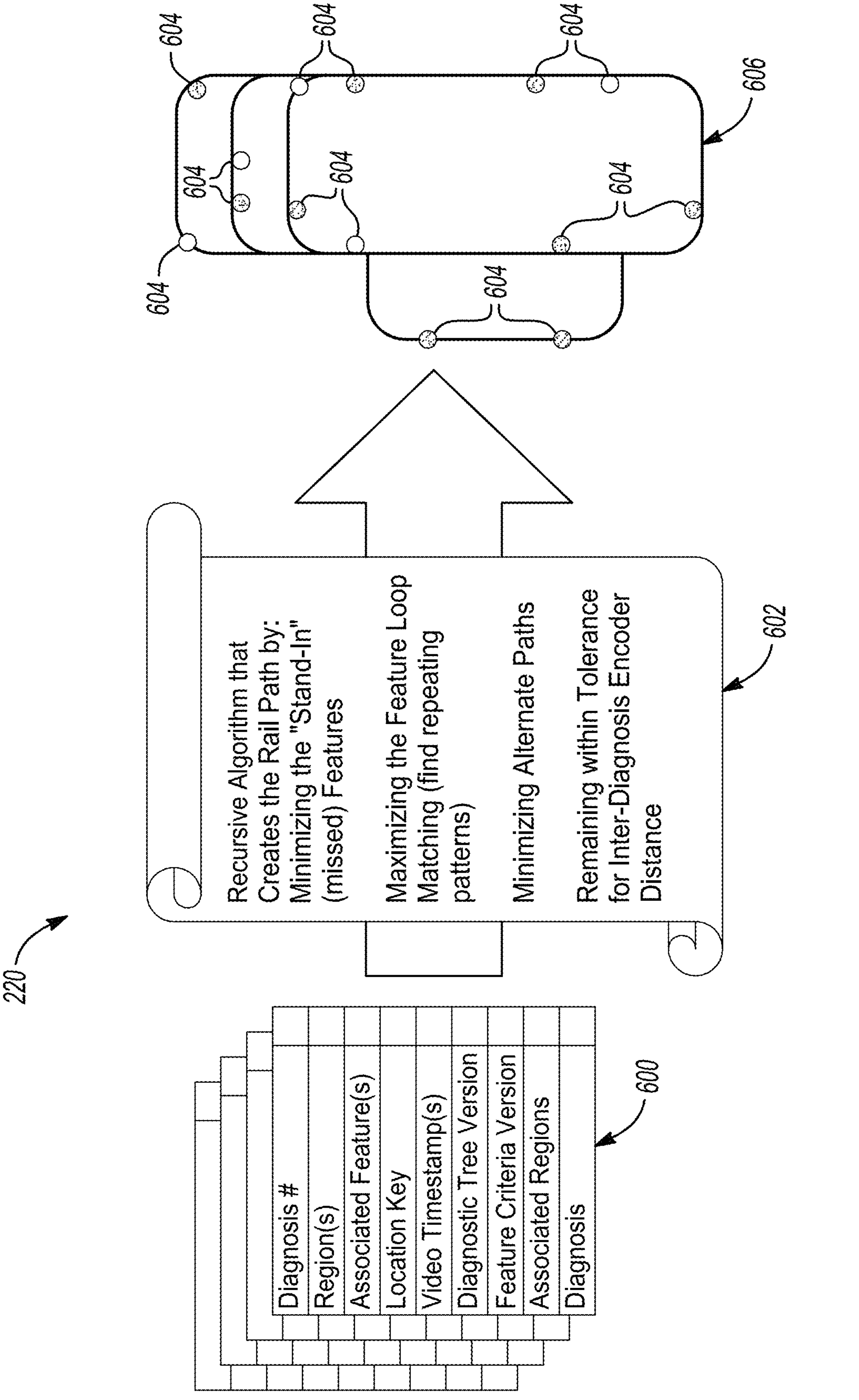
FIG. 8 describes a recursive algorithm for inspecting a conveyor rail system.

Refer also now to FIG. 8. There, the characteristics 600 of the various diagnoses may be fed to a recursive algorithm 602. Those characteristics may include Diagnosis Identifier Number, Region(s), Associated Feature(s), Location Key, Video Timestamp(s), Version of Diagnostic Tree Employed, Version of the Feature Criteria Employed, Related/Associated Regions, and the specific diagnosis.

By its recursive nature, recursive algorithm 602 may minimize missed features/issues/faults, find repeating patterns, minimize alternative paths, and stay within tolerance for inter-diagnosis encoder distance. Using a recursive algorithm such as recursive algorithm 602 allows confirmation of the diagnosis and location of faults 604 in the rails of conveyor system 606. Such confirmation may be advantageous where diagnosis of a fault may be "borderline" and repeated detection of the fault may confirm its existence and location. In using recursive algorithm 602, the light beam used to inspect the rail may be translated a plurality of times. In that way, recursive algorithm 602 may detect faults that were missed during an earlier translation of the light beam. Recursive algorithm 602 may also confirm earlier diagnoses that may have been questionable. Recursive algorithm 602 may also identify progression of faults over time.

Recursive algorithm 602 may:

Create the Rail Path by Minimizing the "Stand-In" (missed) Features;

Maximize the Feature Loop Matching (i.e., find repeating patterns)

Minimize Alternate Paths

Remain within Tolerance for Inter-Diagnosis Encoder Distance

To enable matching a feature between runs, it may be desirable to normalize the 3D space. The I-beam and/or C-channel physical x- and y-axes are relatively fixed with the field of view of detector 158. A virtual "z" axis may be considered a function of the frames-per-second captured in the video and the velocity of travel of the detector 158. For example, if detector 158 is recording at 20 frames/second and traveling at 1 foot/second, there will be 20 frames captured for a 1 foot long feature in the "z" direction. If in the next pass detector 158 is traveling at 2 feet/second still capturing 20 frames/see, that same feature would only have 10 frames in the video. Similarly, if the velocity was still 1 ft/sec but the video was captured at 10 frames/second, there would again only be 10 frames captured for that 1 foot long feature. Using the encoder wheel information and potentially other known position timestamps for detector 158, any variation in either video frames-per-second or velocity of the capture device through the system may be normalized out. A possible condition of concern will be if detector 158 is stationary for extended periods of time. Frames captured there would be of the same section of the rail and would appear artificially stretched without considering the zero $\Delta z$ distance between frames. This normalization enables features to be "matched" between observations as detector 158 either makes multiple passes relative to the rail through the system or between separate videos of the same system captured a different times (days apart, weeks apart, years apart). However, the more time between video sessions would likely result in more wear features and existing features growing in one or more of the metric attributes.

The control equipment for the inspection system may use fixed position indications. For example, it may be known that a vehicle carrier is scanned at certain points and is directed to go one location or the other. This indication may give definitive spot locations that are anchor points along the path for the algorithm to use. This may dramatically reduce the permutations needed for searching.

Figure 9:
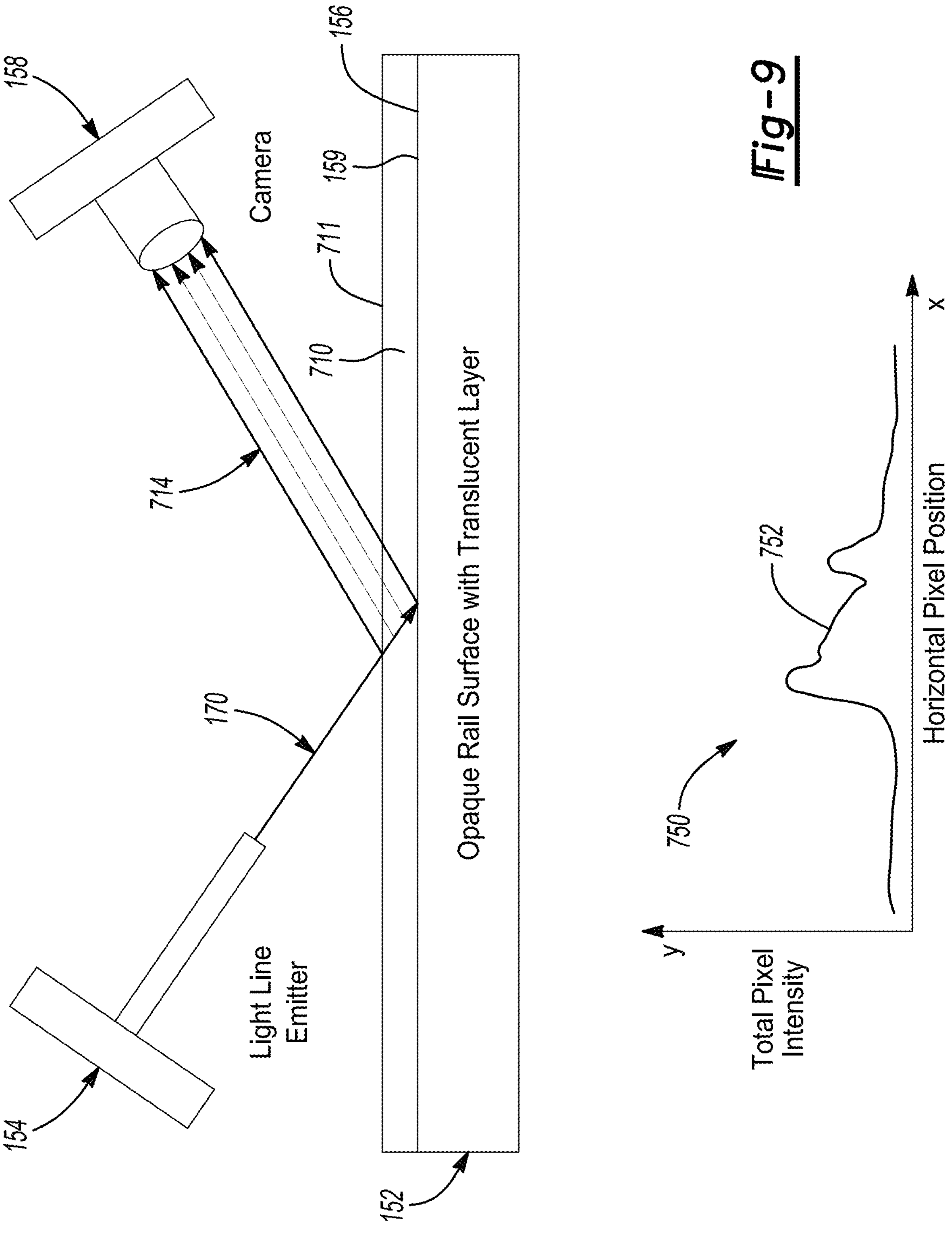
FIG. 9 illustrates reflection of a light beam from a rail having a translucent layer on the surface of the rail.
Figure 10:
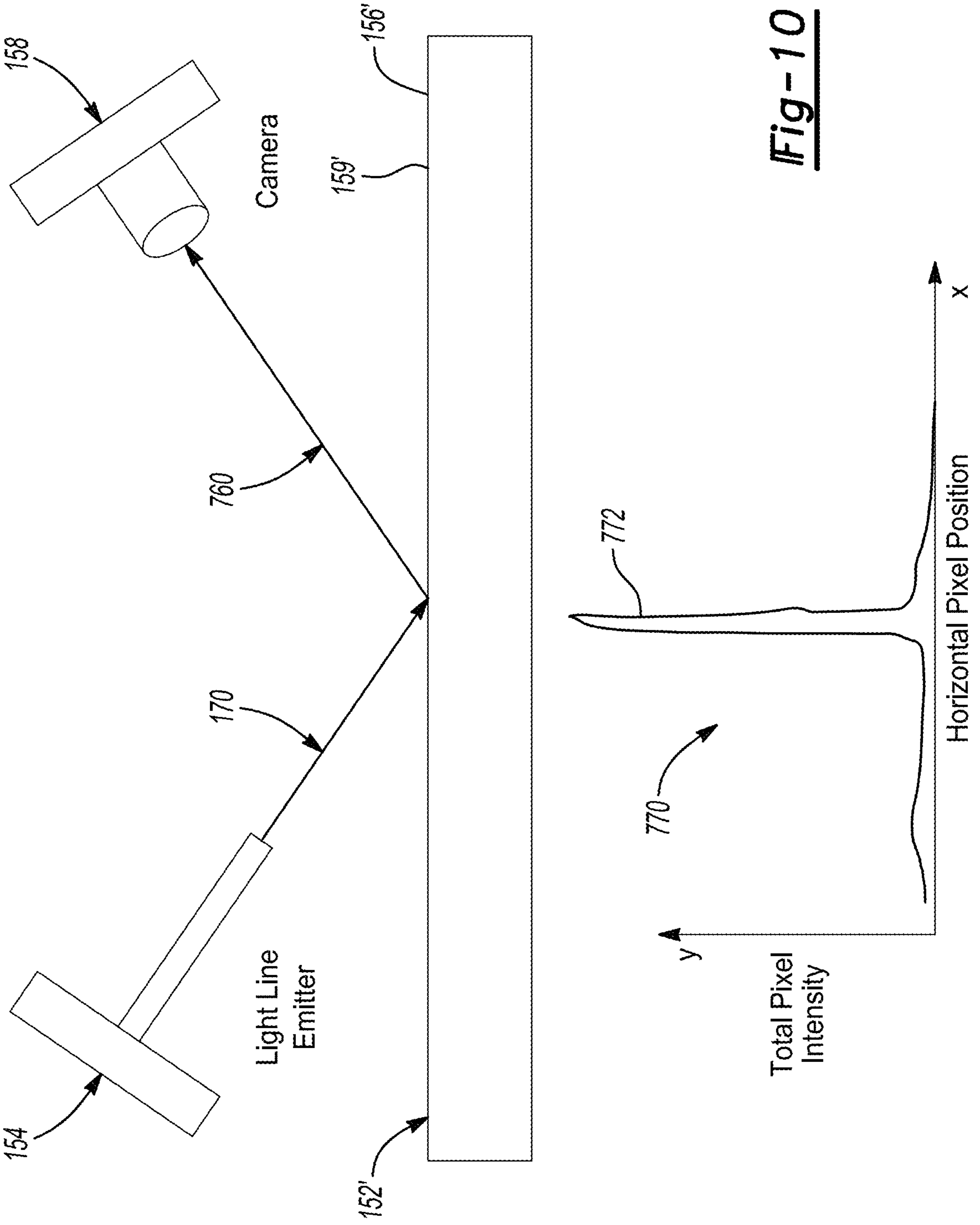
FIG. 10 illustrates reflection of a light beam from a rail having a shiny surface.

Refer now to FIG. 3, FIG. 9, and FIG. 10. Recall the discussion above related to FIG. 3, where light source 154 may emit a beam 170 whose reflection 172 may be detected by light detector 158. FIG. 3 illustrates a situation where surface 159 of rail 152 is unpolished. That is, surface 159 may be painted. In that case, a graph such as graph 700 of pixel intensity versus horizontal pixel position may illustrate a pronounced spike in intensity detected by light detector 158, as shown in curve 702.

However, in FIG. 9 surface 159 of rail 152 may have a coating 710 of grease or other debris. Here, light beam 170 may penetrate into coating 710 and have multiple levels of reflection seen by light detector 158. In that case, light beam 170 from light source 154 may reflect from surface 159 of rail 152 and surface 711 of coating 710. Further, there may be a diffuse reflection from the translucent grease in-between that will likely become decreasingly intense the deeper it penetrates the translucent material. The result may be a more diffuse (i.e., less focused) reflection 714 that is detected by light detector 158. The more diffuse signature of the reflection is illustrated in graph 750, where a wider and less peaked curve 752, relative to curve 702 (FIG. 3) is illustrated. The differences in signatures of curve 702 and curve 752 is an additional issue diagnosis tool that may be employed to identify the nature of an imperfection in rail 152.

Further, in FIG. 10, rail 152' may have a surface 159' (or portion or region thereof) of a flange 156' that is highly reflective. The high level of reflectivity may be due to a scratch, gouge, nick, rut, or similar imperfection in the paint of surface 159'. Such imperfection, because it may expose raw metal to light beam 170 of light source 154 and result in a reflected light beam 760 being sharper (that is, less diffuse or more focused) than in FIG. 3. The sharper signature of the reflection is illustrated in graph 770, where a curve 772 that is narrower and more peaked than curve 702 (FIG. 3) is illustrated. The height of the peak of curve 772 may also be greater than the height of the peak of curve 702. The differences in signatures of curve 702 and curve 772 is an additional issue diagnosis tool that may be employed to identify the nature of an imperfection in rail 152'.

For instance, the different "signatures" of pixel intensity versus pixel position illustrated in curve 702 (FIG. 3), curve 752 (FIG. 9), and curve 772 (FIG. 10) may aid in issue diagnosis in that they will impact the three-dimensional translation illustrated and discussed with reference to FIG. 5.

Figure 11A:
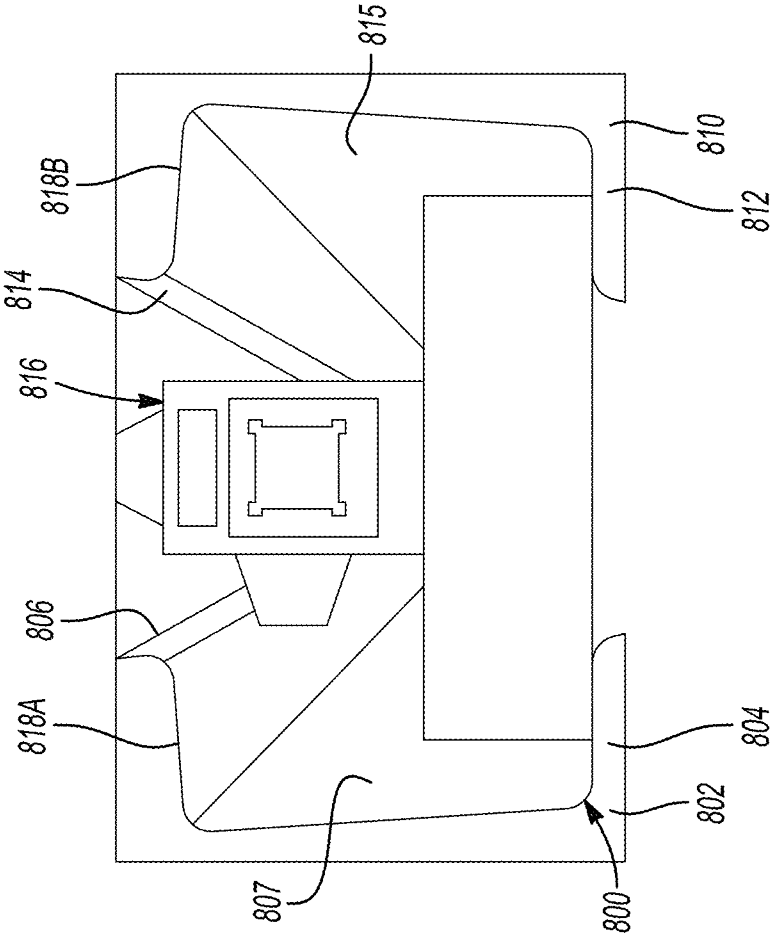
FIG. 11A illustrates a light source used to illuminate an interior of a conveyor rail.
Figure 11B:
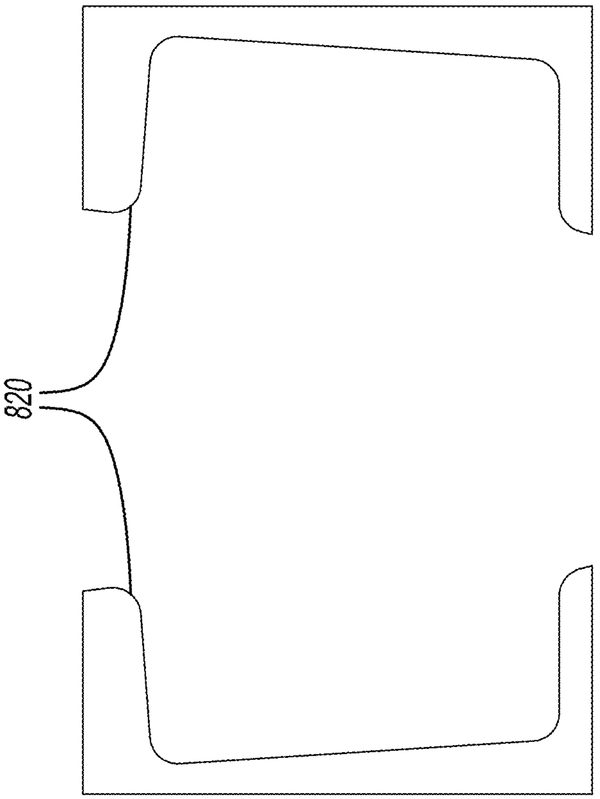
FIG. 11B illustrates an image resulting from illumination of the interior of the conveyor rail of FIG. 11A.

Refer now to FIG. 11A. Here, a rail 800 may include two opposing C-channels. A first C-channel 802 may include a flange 804, a flange 806, and a body 807. A second C-channel 810 may include a flange 812, a flange 814, and a body 815. The inspection device that is translated through the conveyor system may include a laser level 816. Laser level 816 may illuminate the inner periphery of rail 800 with a light beam 818A and light beam 818B. Now referring to FIG. 11B, image 820 created by light beam 818A and light beam 818B will be able to sense sagging of flange 804, flange 806, flange 812, and/or flange 814, thus identifying an issue or fault in rail 800. More generally, laser level 816 may detect deformation of rail 800 or an imperfection in the internal surface of rail 800, again, identifying a feature that may indicate an issue or fault with rail 800. The analysis of image 820 may, at least in part, be consistent with the analysis discussed above with respect to FIG. 5.

Figure 14:
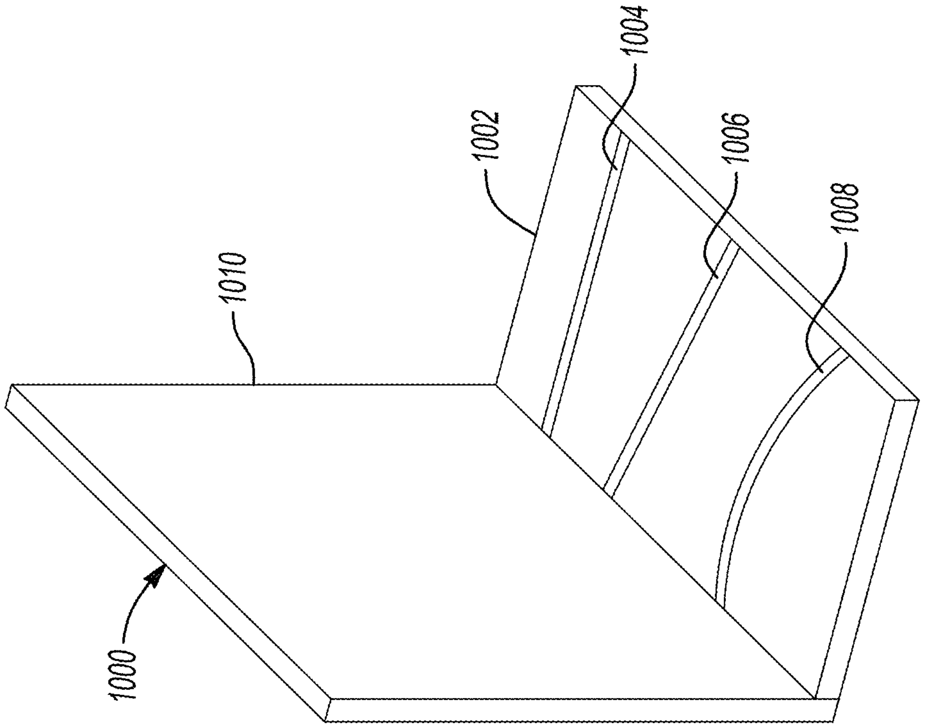
FIG. 14 illustrates other faults that may be diagnosed.

FIG. 14 illustrates faults that may be diagnosed such as with laser level 816. Here, a portion of a rail 1000 is illustrated. The light beam from laser level 816 may run along flange 1002. The shape of the reflected light beam may help with detecting sagging or other deformations in rail 1000. If flange 1002 were not sagging, the line from the light beam would be expected to be horizontal, as shown by line 1004. However, if flange 1002 were sagging downward, line 1006 may result. Further, then, the sagging may not progress linearly and may manifest as curved projection lines, such as curve 1008, as the sag progresses. The difference (linear, such as line 1006 or curved, such as curve 1008) may be an indication of whether the metal failure is at the joint of flange 1002 and wall 1010 (linear, such as line 1006) or fatigue of flange 1002 itself (curved, such as curve 1008).

Figure 15:
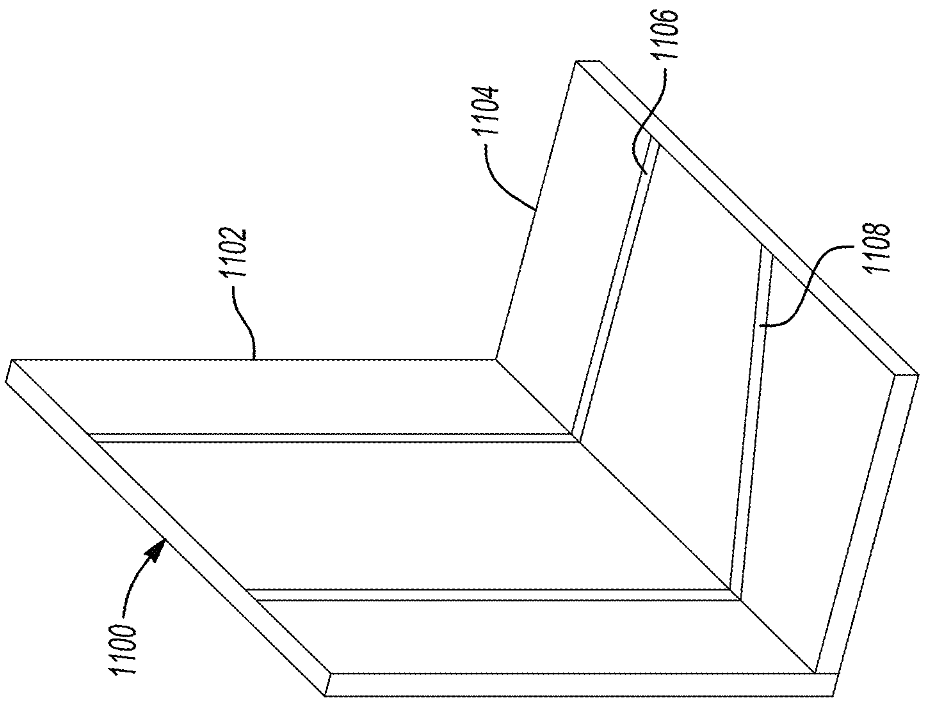
FIG. 15 illustrates additional faults that may be diagnosed.

FIG. 15 further illustrates faults that may be diagnosed such as by laser level 816. Here, a portion of a rail 1100 is illustrated. The light beam from laser level 816 may run along body 1102 and flange 1104 of rail 1100. If rail 1100 were straight, line 1106 from the light beam may be expected to be transverse to the length of rail 1100. However, if rail 1100 were curved (as opposed to sagging) due to deformation, line 1108 from the light beam may be angled, as shown in FIG. 15.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

What is claimed is:

1. A method for inspecting a rail of a conveyor system, the method comprising:

illuminating the rail with a light beam in the form of a line of light directed obliquely to a surface of the rail;

translating the light beam along the rail in a direction of translation, the direction of translation generally perpendicular to the line of light;

sensing reflection of the light beam from the surface as the light beam is translated;

using the reflection to create a three-dimensional topography of the surface;

applying thresholds to the three-dimensional topography to detect features of potential interest in the topography;

determining physical characteristics of the features of potential interest;

using the physical characteristics to identify faults in the rail associated with the features of potential interest; and mapping locations of the faults.

2. The method of claim 1, wherein the faults comprise wear of the rail.

3. The method of claim 1, wherein the faults comprise debris on the rail.

4. The method of claim 1, wherein mapping locations of the faults comprises using a position encoder that measures position of the light beam as the light beam translates along the rail.

5. The method of claim 1, wherein the light beam provides continuous illumination along the line of light.

6. The method of claim 1, further comprising translating the light beam multiple times relative to the rail to confirm the identified faults.

7. The method of claim 1, further comprising translating the light beam a plurality of times relative to the rail to detect faults that were missed during an earlier translation of the light beam.

8. The method of claim 1, wherein the rail is an I-beam.

9. The method of claim 1, wherein the rail comprises two opposing C-channels.

10. The method of claim 1, wherein using the physical characteristics to identify faults in the rail comprises applying the physical characteristics to a fault tree to identify the faults.

11. The method of claim 10, wherein the physical characteristics include depth.

12. The method of claim 10, wherein the physical characteristics include surface area.

13. The method of claim 10, wherein the physical characteristics include R-Value.

14. A method for inspecting a rail of a conveyor system, the method comprising:

illuminating an inner periphery of the rail with a light beam in the form of a line of light;

translating the light beam along the rail in a direction of translation, the direction of translation generally perpendicular to the light beam; and using the light beam to identify one or more faults in the rail.

15. The method of claim 14, wherein the rail comprises two opposing C-channels.

16. The method of claim 14, wherein the one or more faults includes deformation in a shape of the rail.

17. The method of claim 14, wherein the one or more faults includes sagging of the rail.

18. The method of claim 15, wherein the one or more faults includes an imperfection in an internal surface of the rail.

19. A method for inspecting a rail of a conveyor system, the method comprising:

illuminating the rail with a light beam in the form of a line of light directed obliquely to a surface of the rail and extending in a first direction;

translating the light beam along the rail in a direction of translation, the direction of translation generally perpendicular to the first direction;

sensing reflection of the light beam from the surface as the light beam is translated;

using the reflection to construct a three-dimensional topography of the surface, where the three dimensional topography of the surface is constructed using the following:

capturing video of the reflected light beam as the light beam translates along the rail, the video comprising successive frames;

for each of the frames, determining a highest-intensity pixel for each of a plurality of columns that extend parallel to the direction of translation;

saving a y[i,x] location for each highest-intensity pixel, where y is the direction of translation, x is the first direction and i is a number of a respective one of the successive frames; and concatenating the y[i,x] locations to construct the three-dimensional topography.

20. The method of claim 19, further comprising:

applying thresholds to the three-dimensional topography to detect features of potential interest in the topography;

determining physical characteristics of the features of potential interest;

using the physical characteristics to identify faults in the rail associated with the features of interest; and mapping locations of the faults.

* * * * *